(12) United States Patent
Minamisawa et al.

(10) Patent No.: US 9,511,774 B2
(45) Date of Patent: Dec. 6, 2016

(54) SHIFT CONTROL DEVICE FOR CONTINUOUSLY VARIABLE TRANSMISSION

(71) Applicant: Fuji Jukogyo Kabushiki Kaisha, Tokyo (JP)

(72) Inventors: Yasuhito Minamisawa, Tokyo (JP); Keisuke Ajimoto, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/577,543

(22) Filed: Dec. 19, 2014

(65) Prior Publication Data

US 2015/0183437 A1 Jul. 2, 2015

(30) Foreign Application Priority Data

Dec. 27, 2013 (JP) .................. 2013-271085

(51) Int. Cl.

| B60W 30/19 | (2012.01) |
| B60W 10/04 | (2006.01) |
| B60W 10/107 | (2012.01) |
| F16H 61/02 | (2006.01) |
| F16H 61/662 | (2006.01) |
| B60W 50/08 | (2012.01) |
| B60W 10/06 | (2006.01) |
| F16H 61/66 | (2006.01) |
| F16H 59/20 | (2006.01) |

(52) U.S. Cl.
CPC .............. *B60W 30/19* (2013.01); *B60W 10/04* (2013.01); *B60W 10/06* (2013.01); *B60W 10/107* (2013.01); *B60W 50/082* (2013.01); *F16H 61/0213* (2013.01); *F16H 61/66259* (2013.01); *B60W 2510/104* (2013.01); *B60W 2510/1015* (2013.01); *B60W 2540/04* (2013.01); *B60W 2540/103* (2013.01); *B60W 2710/0666* (2013.01); *B60W 2710/1005* (2013.01); *F16H 59/20* (2013.01); *F16H 2061/0232* (2013.01); *F16H 2061/0244* (2013.01); *F16H 2061/6611* (2013.01)

(58) Field of Classification Search
None
See application file for complete search history.

(56) References Cited

U.S. PATENT DOCUMENTS

2009/0240406 A1* 9/2009 Fukushima ........... B60W 10/06
701/54

FOREIGN PATENT DOCUMENTS

| JP | 2004-125072 A | 4/2004 |
| JP | 2007-278266 A | 10/2007 |

* cited by examiner

*Primary Examiner* — Erin D Bishop
(74) *Attorney, Agent, or Firm* — McGinn IP Law Group, PLLC.

(57) ABSTRACT

A shift control device includes a kick-down control unit that, in the case where the accelerator is depressed to a certain level or beyond, executes a first kick-down mode, in which a gear ratio of the continuously variable transmission is changed to a low side to increase the engine speed. In the case where, during execution of the first kick-down mode, a switchover operation is accepted to switch the output properties such that output of the engine is increased, the kick-down control unit again determines whether or not to start the first kick-down control again.

19 Claims, 4 Drawing Sheets

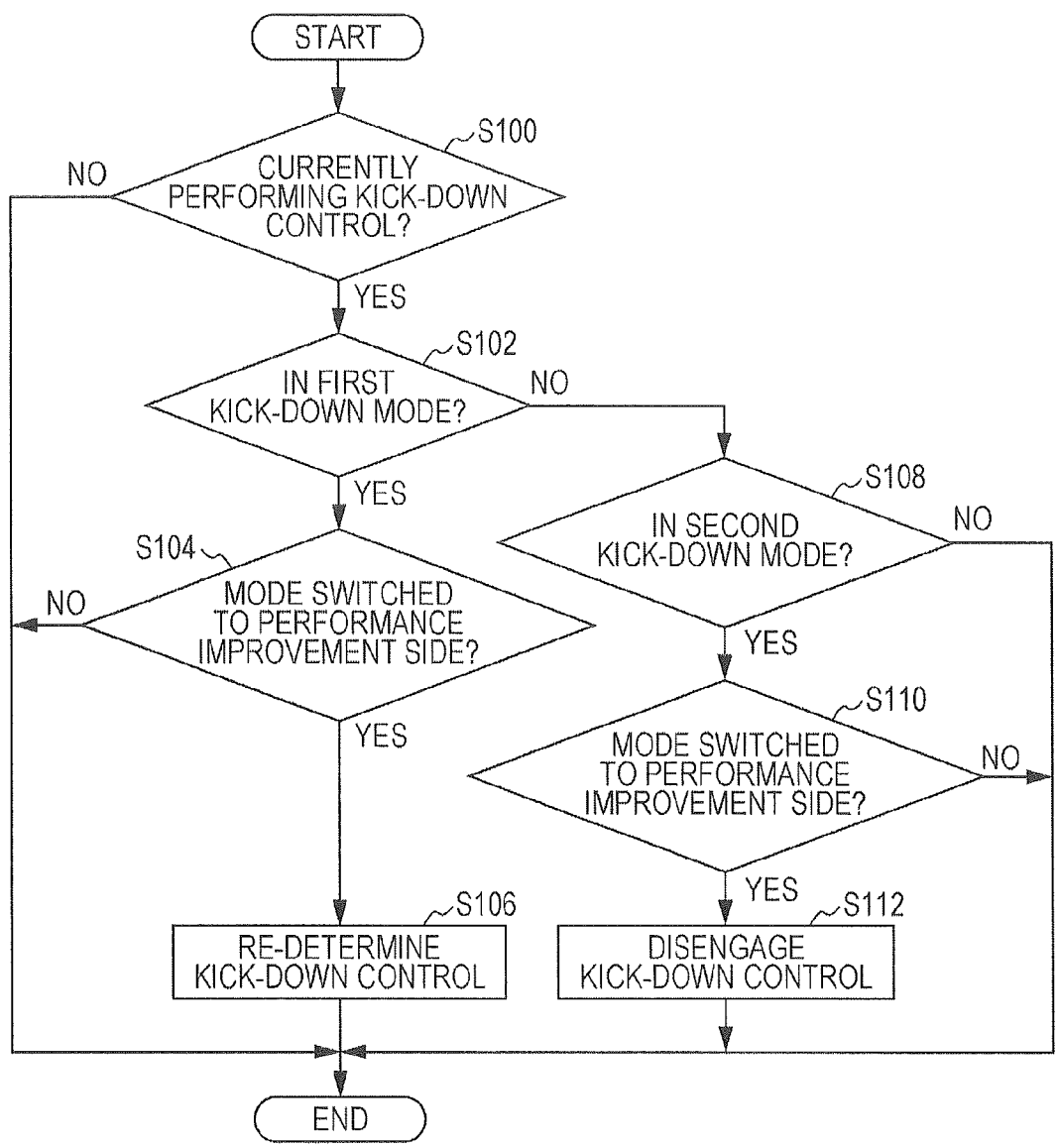

SHIFT CONTROL DEVICE FOR CONTINUOUSLY VARIABLE TRANSMISSION

CROSS-REFERENCE TO RELATED APPLICATIONS

The present application claims priority from Japanese Patent Application No. 2013-271085 filed on Dec. 27, 2013, the entire contents of which are hereby incorporated by reference.

BACKGROUND

1. Technical Field

The present invention relates to a shift control device for a continuously variable transmission, and more particularly relates to a shift control device for a continuously variable transmission installed in a vehicle capable of switching over an engine output properties in accordance with driver operations.

2. Related Art

Continuously variable transmissions (CVTs), such as belt type CVTs and toroidal type CVTs, which can steplessly change the gear ratio, have come into widespread use in recent years as automotive automatic transmissions. A belt type continuously variable transmission includes a primary pulley provided to an input shaft, a secondary pulley provided to an output shaft, and a drive transmission component such as a belt or chain, wound over the pulleys. The gear ratio is steplessly changed by changing the groove width of the pulleys, thereby changing the diameter of the position where the drive transmission component rides.

The gear ratio of such continuously variable transmissions is controlled in accordance with parameters indicating the running state of the vehicle, such as accelerator position and vehicle speed, for example. This means that target engine speed (or target turbine speed, target primary pulley speed) are set based on these parameters, and the gear ratio is set such that the actual engine speed converges on the target engine speed.

Also, the continuously variable transmissions, in general, execute kick-down control (see Japanese Unexamined Patent Application Publication No. 2004-125072, for example), which is rapid acceleration control, in the case where the driver steps down on the acceleration pedal to request acceleration, and particularly in the case where the throttle position is around or beyond an intermediate position.

On the other hand, vehicles that enable the driver to switch an engine output properties according to preference have come into practical use in recent years. More specifically, vehicles have come into practical use that enable the driver to optionally select the engine output properties from three modes for example, which are a normal mode suitable for normal driving, a save mode (or economy mode) where output torque is suppressed to conserve gas mileage, and a power mode that give priority to power. This power mode exhibits output properties with good response from low speed through high speed (see Japanese Unexamined Patent Application Publication No. 2007-278266, for example).

Now, if a driver for example performs an operation during kick-down control of the continuously variable transmission (during rapid acceleration) to switch output properties (output mode) toward increased engine output (for example, an operation to switch from the above-described normal mode or save mode to power mode), it can be assumed that the driver desires to drive more aggressively. As such, it can be conceived to be desirable to enable the driver to physically feel the results of the switching operation regarding the engine output properties during kick-down more vigorously. However, the above-described conventional continuously variable transmissions have not taken into consideration giving the driver such a feeling of switching.

SUMMARY OF THE INVENTION

The present invention has been made in light of the above-described problem, and accordingly it is an object thereof to provide a shift control device of a continuously variable transmission capable of enabling the driver to more vigorously feel the results of a switching operation of the engine output properties during kick-down of the continuously variable transmission to increase engine output.

An aspect of the present invention provides a shift control device of a continuously variable transmission including a switchover operation accepting unit that accepts switching operations of an output properties performed by a driver regarding an engine output properties, and a kick-down control unit that executes a first kick-down control, in which a gear ratio of a continuously variable transmission is changed to a low side to increase engine speed, in the case where the accelerator is depressed to a certain level or beyond. In the case, during execution of the first kick-down control, the switchover operation accepting unit accepts a switchover operation to switch the output properties such that output of the engine is increased, the kick-down control unit again determines whether or not to start the first kick-down control.

In the case where the engine speed reaches predetermined speed during execution of the first kick-down control, the kick-down control unit may execute a second kick-down control to change the gear ratio to upshift. In the case where, during execution of the second kick-down control, the switchover operation accepting unit accepts a switchover operation to switch the output properties such that output of the engine is increased, the kick-down control unit may disengage the second kick-down control.

In the case where the accelerator is released during execution of the first kick-down control, the kick-down control unit may execute a third kick-down control to hold the gear ratio. In the case where, during execution of the third kick-down control, the switchover operation accepting unit accepts a switchover operation to switch the output properties such that output of the engine is increased, the kick-down control unit may hold the gear ratio.

In the case where, during execution of the any one of the first kick-down control, second kick-down control, and third kick-down control, the switchover operation accepting unit accepts a switchover operation to switch the output properties such that output of the engine is decreased, the kick-down control unit may continue to execute the control.

BRIEF DESCRIPTION OF THE DRAWINGS

FIG. 4 is a flowchart illustrating kick-down control processing procedures by the shift control device of the continuously variable transmission according to the implementation.

DETAILED DESCRIPTION

Figure 1:
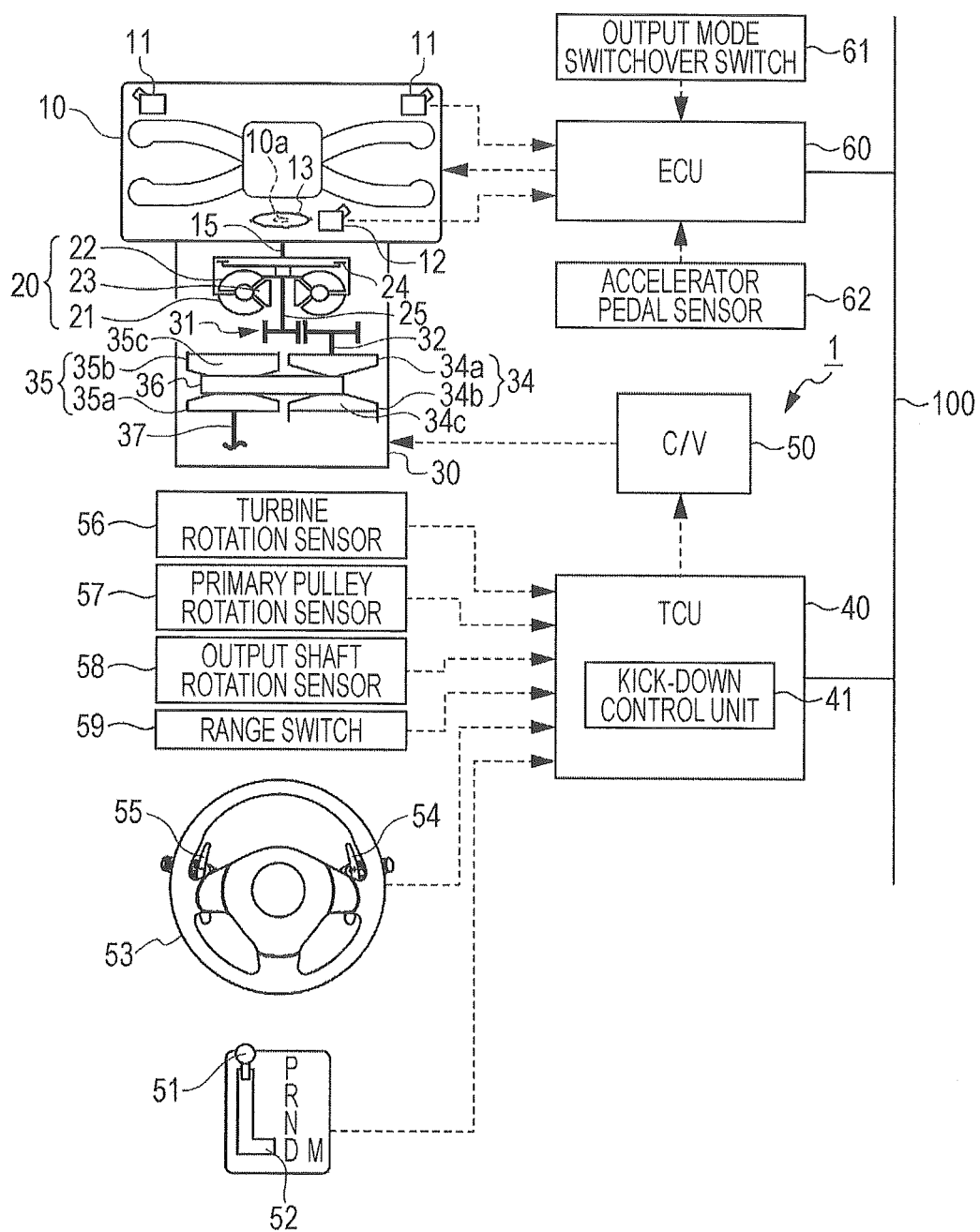
FIG. 1 is a block diagram illustrating the configuration of a shift control device for a continuously variable transmission according to an implementation.

An implementation of the present invention will be described in detail with reference to the drawings. Components that are the same or equivalent in the drawings are denoted with the same reference numerals. The same components in the drawings are denoted with the same reference numerals, and redundant description thereof will be omitted.

First, the configuration of a shift control device 1 of a continuously variable transmission according to the implementation will be described with reference to FIG. 1. FIG. 1 is a block diagram illustrating the configuration of the shift control device 1 for a continuously variable transmission, and a continuously variable transmission 30 to which the shift control device 1 of the continuously variable transmission has been applied.

An engine 10 may be of any type, and the description will be made with regard to a horizontally-opposed four-cylinder gasoline engine as an example. The engine 10 is configured so as to be capable of switching between three output property modes (three stages). More specifically, the engine 10 is set such that the output torque thereof changes generally linearly as to the amount of depression of the accelerator pedal (accelerator position). Switching between a normal mode that is suitable for normal driving, a save mode where output torque is suppressed to realize both easy driving and good gas mileage (economy mode), and a power mode that give priority to power, exhibiting output properties with good response from low speed through high speed, can be performed by a switchover switch 61 that serves as the switchover operation accepting unit of the present invention in the present implementation. The output mode switchover switch 61 is disposed on the center console, for example, or the like. Of these modes, the power mode has the greatest engine output, next in order is the normal mode, and the save mode (economy mode) has the smallest engine output of all output modes.

A cam angle sensor 11 is attached nearby a camshaft of the engine 10, to distinguish cylinders of the engine 10. A crank angle sensor 12 that detects rotational position of a crankshaft 10a of the engine 10 is attached nearby the crankshaft 10a. A timing rotor 13 is disposed on an end of the crankshaft 10a. The timing rotor 13 has cog-like protrusions provided every 10 degrees, except for two positions, so there are a total of 34 protrusions. The crank angle sensor 12 detects the rotational position of the crankshaft 10a by the presence/absence of protrusions on the timing rotor 13. Magnetic pickup type configurations are preferably used for the cam angle sensor 11 and crank angle sensor 12. The cam angle sensor 11 and crank angle sensor 12 are connected to a later-described engine control unit (hereinafter referred to as "ECU") 60.

An output shaft 15 of the engine 10 is connected to the continuously variable transmission 30 that converts and outputs driving force from the engine 10, via a torque converter 20 that has clutch function and torque amplifying functions.

The torque converter 20 is configured primarily including a pump impeller 21, a turbine liner 22, and a stator 23. The pump impeller 21 that is connected to the output shaft 15 generates oil flow, and the turbine liner 22 disposed facing the pump impeller 21 receives the power of the engine 10 through the oil, so as to drive the output shaft. The stator 23 that is interposed between the two rectifies the discharge flow (return) from the turbine liner 22 and returns this to the pump impeller 21, thus realizing the torque amplifying effect.

The torque converter 20 also includes a lock-up clutch 24 that places the input and output in a directly coupled state. The torque converter 20 amplifies the torque of the driving force of the engine 10 when the lock-up clutch 24 is not engaged (when in a non-lock-up state) and transmits to the continuously variable transmission 30, and directly transmits the driving force of the engine 10 to the continuously variable transmission 30 when the lock-up clutch 24 is engaged (when in a lock-up state). The speed of the turbine liner 22 (turbine speed) making up the torque converter 20 are detected by a turbine speed sensor 56. The detected turbine speed is output to a later-described transmission control unit (hereinafter referred to as "TCU") 40. A magnetic pickup type configuration is preferably used for the turbine speed sensor 56, for example.

The continuously variable transmission 30 includes a primary shaft 32 connected to an output shaft 25 of the torque converter 20 via a reduction gear 31, and a secondary shaft 37 disposed in parallel with the primary shaft 32.

The primary shaft 32 is provided with a primary pulley 34. The primary pulley 34 includes a fixed sheave 34a that is affixed to the primary shaft 32, and a movable sheave 34b that is slidably movable in the axial direction of the primary shaft 32 in relation to the fixed sheave 34a, so that the spacing between the conical faces of the sheaves 34a and 34b, i.e., the pulley groove width, can be changed. On the other hand, the secondary shaft 37 includes a secondary pulley 35. The secondary pulley 35 includes a fixed sheave 35a that is affixed to the secondary shaft 37, and a movable sheave 35b that is slidably movable in the axial direction of the secondary shaft 37 in relation to the fixed sheave 35a, so that the pulley groove width can be changed.

A chain 36 wound around the primary-pulley 34 and the secondary pulley 35 to transmit driving force. The gear ratio is steplessly changed by changing the groove widths of the primary pulley 34 and secondary pulley 35 by changing the ratio of the belt loop radius of the chain 36 riding on the pulleys 34 and 35 (pulley ratio). The gear ratio i can be expressed by $$i = Rs/Rp$$

where Rp represents the pitch radius of the chain 36 as to the primary pulley 34, and Rs as to the secondary pulley 35.

Now, a hydraulic chamber 34c is formed in the primary pulley 34 (movable sheave 34b), and a hydraulic chamber 35c is formed in the secondary pulley 35 (movable sheave 35b). the groove widths of the primary pulley 34 and secondary pulley 35 are set and changed by adjusting primary oil pressure introduced to the hydraulic chamber 34c of the primary pulley 34 and secondary oil pressure introduced to the hydraulic chamber 35c of the secondary pulley 35.

The oil pressure for causing the continuously variable transmission 30 to change speeds, i.e., the aforementioned primary oil pressure and secondary oil pressure is controlled by a valve body (control valve) 50. The valve body 50 adjusts oil pressure of oil discharged from an oil pump by opening and closing an oil passage formed within the valve body 50, using a spool valve and a solenoid valve (electromagnetic valve) to move the spool valve. The valve body 50 thus provides the hydraulic chamber 34c of the primary pulley 34 and the hydraulic chamber 35c of the secondary pulley 35 with oil pressure. The valve body 50 also supplies oil pressure to a forward/reverse switching mechanism that switches the forward/reverse directions of the vehicle, and so forth, for example.

A shift lever (select lever) 51 that accepts driver operations to switch to one or the other of an automatic shift mode ("D" range) and manual shift mode ("M" range) is provided on the floor (center console) or the like of the vehicle. The shift lever 51 has attached thereto a range switch 59 that is connected so as to operate in conjunction with the shift lever 51, to detect the selected position of the shift lever 51. The range switch 59 is connected to the TCU 40, and the selected position of the shift lever 51 that has been detected is read by the TCU 40. The shift lever 51 is used to selectively switch between, in addition to the "D" range and "M" range, a parking "P" range, reverse "R" range, and neutral "N" range.

The shift lever 51 includes an M range switch 52 that is turned on when the shift lever 51 is at the "M" range side position, i.e., when the manual shift mode, and is turned off when the shift lever 51 is at the "D" range side, i.e., when the automatic shift mode. The M range switch 52 is also connected to the TCU 40.

On the other hand, behind a steering wheel 53 are provided a plus (+) paddle switch 54 and a minus (−) paddle switch 55 that accept driver gear shift operations (gear shift requests) when the manual gear shift mode has been selected. Hereinafter, the plus paddle switch 54 and minus paddle switch 55 may be collectively referred to as "paddle switches 54 and 55". The plus paddle switch 54 is used to manually shift up, and the minus paddle switch 55 is used to manually shift down.

The plus paddle switch 54 and the minus paddle switch 55 are connected to the TCU 40, and switch signals of the paddle switches 54 and 55, output from the paddle switches 54 and 55, are read by the TCU 40. The TCU 40 is also provided with a primary pulley rotation sensor 57 that detects the rotation number of the primary pulley 34, an output shaft rotation sensor (vehicle sensor) 58 that detects the rotation number of the secondary shaft 37, and so forth.

As described above, the continuously variable transmission 30 has two gear shift modes that can be selectively switched over by operating the shift lever 51; an automatic gear shift mode, and a manual gear shift mode. The automatic gear shift mode is selected by operating the shift lever 51 to the D range, and in this mode the gear ratio is automatically changed in accordance with the driving state of the vehicle. The manual gear shift mode is selected by operating the shift lever 51 to the M range, and in this mode the gear ratio is switched by the driver performing gear shift operations by operating the paddle switches 54 and 55.

The shift control of the continuously variable transmission 30 is performed by the TCU 40. The TCU 40 controls the driving of the solenoid valve (electromagnetic valve) of the aforementioned valve body 50, thereby adjusting the oil pressure supplied to the hydraulic chamber 34c of the primary pulley 34 and the hydraulic chamber 35c of the secondary pulley 35 so as to change the gear ratio of the continuously variable transmission 30.

The TCU 40 is communicably connected to the ECU 60 that centrally controls the engine 10, via a controller area network (CAN) 100, for example.

The TCU 40 and ECU 60 are configured including a microprocessor that performs computations, read only memory (ROM) that stores programs and so forth so as to cause the microprocessor to execute the various processes, random-access memory (RAM) that stores various types of data such as computation results and so forth, a backup RAM that holds the stored contents by way of a 12 V battery, an input/output interface, and so forth.

The above-described output mode switchover switch 61 is connected to the ECU 60. Also connected to the ECU 60 are various types of sensors, such as an acceleration pedal sensor 62 configured to detect the position of the acceleration pedal, which is the amount by which the acceleration pedal has been depressed, an airflow meter (omitted from illustration) to detect air intake amount, a coolant temperature sensor to detect the temperature of coolant for the engine 10, an air-fuel ratio sensor, and so forth.

The ECU 60 distinguishes cylinders from the output of the cam angle sensor 11, and calculates the engine speed from change in the rotational position of the crankshaft 10a detected by output of the crank angle sensor 12. The ECU 60 further obtains various types of information from detection signals input from the various aforementioned sensors, such as air intake amount, accelerator pedal position, air-fuel ratio of the air-fuel mixture, engine coolant temperature, and so forth. The ECU 60 moreover centrally controls the engine 10, by controlling the amount of fuel injection and spark timing, and controlling various devices, based on the various types of information obtained.

The ECU 60 switches the engine output properties (output mode) in three stages (power mode, normal mode, and save mode), by switching a fuel injection amount map, an ignition timing map, and so forth, for example, in accordance with the position of the output mode switchover switch 61. Maps for the power mode are set such that the engine output is greatest of all output modes. On the other hand, maps for the save mode are set such that the engine output is smallest of all output modes, and maps for the normal mode are set such that the engine output is between that of the power mode and that of the save mode. The ECU 60 transmits information such as engine speed, position of output mode switchover switch 61 (or output mode (normal mode/save mode/power mode)), acceleration pedal position, and so forth, to the TCU 40 via the CAN 100.

Figure 2:
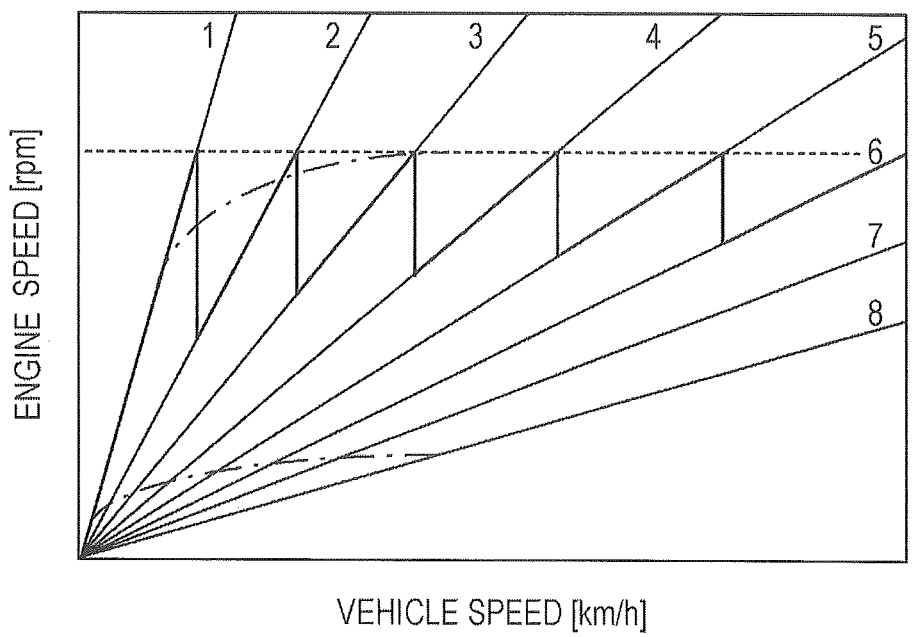
FIG. 2 is a diagram illustrating gear ratio settings of the continuously variable transmission according to the implementation.

In the case where automatic shift mode has been selected, the TCU 40 follows a gear shift map to automatically shift gears steplessly in accordance with the running state of the vehicle (e.g., accelerator pedal position, vehicle speed, etc.). The gear shift map corresponding to the automatic shift mode is stored in the ROM of the TCU 40. FIG. 2 is a gear shift property line diagram, illustrating the relation between engine speed and vehicle speed. The horizontal axis in FIG. 2 is vehicle speed (km/h), and the vertical axis is engine speed (rpm). The eight solid lines each illustrate the relation between the engine speed at each gear (speed) and the vehicle speed in the case where the gear ratio is unchanged (i.e., gear ratio properties when in manual shift mode). In automatic shift mode, any gear ratio from first speed (low) to eighth speed (overdrive) illustrated in FIG. 2 (the region indicated by the single-dot dashed line in FIG. 2) is automatically set in accordance to the vehicle running state. On the other hand, when the manual shift mode has been selected, the TCU 40 controls the gear ratio based on the shift operations accepted by the paddle switches 54 and 55.

In particular, the TCU 40 has a function to control the gear ratio in automatic shift mode, so as to enable the driver to feel the results of a switching operation of engine output properties (output mode) during kick-down control to increase output of the engine 10, as change in shift behavior. To this end, the TOO 40 functionally includes a kick-down control unit 41. In the TCU 40, the functions of the kick-down control unit 41 are realized by a program that is stored in the ROM and executed by the microprocessor.

In the case where the accelerator is depressed to a certain level or beyond, the splitter 41 performs kick-down control where the gear ratio of the continuously variable transmission 30 is changed to the low side and the engine speed is rapidly increased (first kick-down mode). The kick-down control unit 41 thus serves as the kick-down control unit of the present invention.

Figure 3:
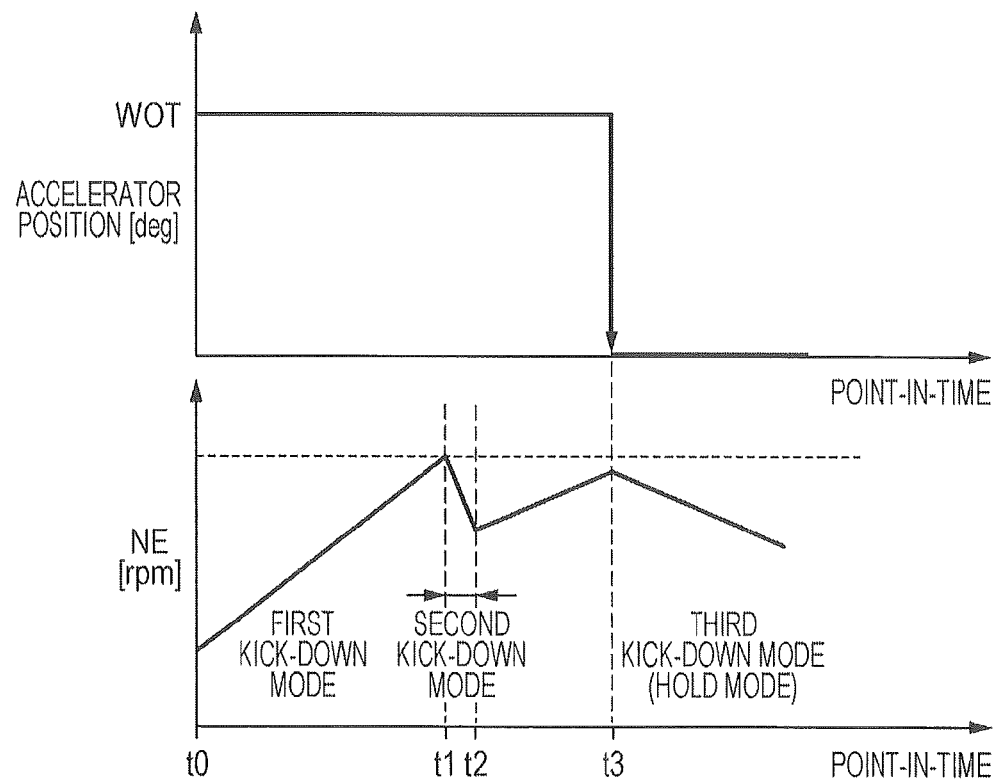
FIG. 3 is a diagram for describing control modes for kick-down control (first, second, and third kick-down modes)

The kick-down control has the following three control modes as illustrated in FIG. 3. One is a first kick-down mode where engine speed (turbine rotation number, primary pulley rotation number) is increased by changing the gear ratio to downshift, or to change (or fix) the gear ratio so as to match the increase in vehicle speed. This first kick-down mode serves as the first kick-down control according of the present invention (see point-in-time t0 through t1 and point-in-time t2 through t3 in FIG. 3). Another is a second kick-down mode where engine speed (turbine rotation number, primary pulley rotation number) is decreased by changing the gear ratio to upshift (e.g., changing the gear ratio one higher), when the engine speed has reached predetermined speed (e.g., a rev limit) when in the first kick-down mode (or when a predetermined amount of time has elapsed). This second kick-down mode serves as the second kick-down control of the present invention (see point-in-time t1 through t2 in FIG. 3). The other is a third kick-down mode where the gear ratio is held in the case where depressing of the accelerator pedal is suddenly released when in the first kick-down mode (or in either one of the first kick-down mode and second kick-down mode). This third kick-down mode serves as the third kick-down control of the present invention (see point-in-time t3 in FIG. 3).

In the case where the kick-down control unit 41 accepts a switchover operation from the output mode switchover switch 61 while executing the first kick-down mode, to switch the output properties such that the output of the engine 10 is increased (i.e., switching from save mode to either one of normal mode and power mode, or switching from normal mode to power mode), the kick-down control unit 41 starts kick-down control (first kick-down mode) determination again. In this case, kick-down conditions such as throttle position and so forth have already been established, so the kick-down control unit 41 starts the kick-down control (first kick-down mode) from the beginning again.

Also, when the engine speed has reached predetermined speed (e.g., a rev limit) when in the first kick-down mode (or when a predetermined amount of time has elapsed), the kick-down control unit 41 executes the second kick-down mode where the gear ratio is changed to upshift, as described above. The kick-down control unit 41 then repeatedly executes the first kick-down mode and the second kick-down mode, thereby performing stepped gear shift operations the same as kick-down operations in a stepped automatic transmission (AT). In the case where the kick-down control unit 41 accepts a switchover operation while in the second kick-down mode, to switch the output properties such that the output of the engine 10 is increased, the kick-down control unit 41 disengages the second kick-down mode (kick-down control), and returns to normal shift control.

Also, in the case where depressing of the accelerator pedal is suddenly released when in the first kick-down mode (or in either one or the first kick-down mode and second kick-down mode), the kick-down control unit 41 executes the third kick-down mode (hold mode) where the gear ratio is held, as described above. In the case where the kick-down control unit 41 accepts a switchover operation while in the third kick-down mode, to switch the output properties such that the output of the engine 10 is increased, the kick-down control unit 41 continues to hold the same gear ratio at that time.

In the case where the kick-down control unit 41 accepts a switchover operation from the output mode switchover switch 61 when executing kick-down control (any one of first kick-down mode, second kick-down mode, and third kick-down mode) to switch the output properties such that the output of the engine 10 is decreased (i.e., switching from power mode to either one of normal mode and save mode, or switching from power mode to normal mode), the kick-down control unit 41 continues executing the kick-down control (any one of first kick-down mode, second kick-down mode, and third kick-down mode) that is executed at that time.

Next, operations of the shift control device 1 for a continuously variable transmission will be described with reference to FIG. 4. FIG. 4 is a flowchart illustrating kick-down processing procedures by the shift control device 1 for a continuously variable transmission. This processing is repeated every certain time interval (e.g., every 10 ms) at the TCU 40.

First, in step S100, determination is made regarding whether kick-down control (any one of first kick-down mode, second kick-down mode, and third kick-down mode) is being executed. In the case where kick-down control is being executed, the flow advances to step S102. On the other hand, in the case where kick-down control is not being executed, the flow ends.

In step S102, determination is made regarding whether or not the control mode for kick-down control is the first kick-down mode. The first kick-down mode has been described in detail above, so detailed description thereof will be omitted here. If in the first kick-down mode, the flow advances to step S104. On the other hand, if not in the first kick-down mode, the flow advances to step S108.

In step S104, determination is made regarding whether or not a switchover operation to switch the output properties such that the output of the engine 10 is increased has been accepted, i.e., whether or not the output mode has been switched toward increasing the engine output (improving the performance). In the case where the output mode has been switched toward increasing the engine output, the flow advances to step S106. On the other hand, in the case where the output mode has not been switched, and in the case where the output mode has been switched toward decreasing the engine output, the flow ends.

Determination is made again in step S106 regarding whether or not to start kick-down control (first kick-down mode) again. In this case, kick-down conditions such as throttle position and so forth have already been established, so the kick-down control (first kick-down mode) is started from the beginning again. Thereafter, the flow ends.

On the other hand, in the case where determination is made in step S102 above that the control mode for kick-down control is not the first kick-down mode, in step S108 determination is made regarding whether or not the control mode for kick-down control is the second kick-down mode. The second kick-down mode has been described in detail above, so detailed description thereof will be omitted here. If in the second kick-down mode, the flow advances to step S110. On the other hand, if not in the second kick-down mode, the flow ends.

In step S110, determination is made regarding whether or not a switchover operation to switch the output properties such that the output of the engine 10 is increased has been accepted, i.e., whether or not the output mode has been switched toward increasing the engine output (improving the performance). In the case where the output mode has been switched toward increasing the engine output, the flow advances to step S112. On the other hand, in the case where the output mode has not been switched, and in the case where the output mode has been switched toward decreasing the engine output, the flow ends.

In step S112, kick-down control (second kick-down mode) is disengaged, the shift control device 1 returns to normal shift control, and the flow ends.

As described above, according to an implementation, in the case where, during execution of the first kick-down mode, a switchover operation is accepted to switch the output properties such that output of the engine 10 is increased, determination is performed again regarding whether or not to start kick-down control (first kick-down control). Thus, the vehicle can be accelerated by the kick-down control (first kick-down control) being started again, and the engine speed increasing rapidly. This enables the driver to more vigorously feel the results of a switching operation of the engine output properties, during kick-down control of the continuously variable transmission 30, to increase output of the engine 10.

Also, according to the implementation, in the case where, during execution of the second kick-down mode, a switchover operation is accepted to switch the output properties such that output of the engine 10 is increased, the second kick-down mode, which is to say the upshift control, is disengaged. Thus, decrease in the engine speed due to upshifting is stopped. Accordingly, in the case where the engine output properties are switched to increase the output of the engine 10 during kick-down control involving upshift as well, the driver can feel the results of the switching as change in shift behavior.

On the other hand, according to the implementation, in the case where, during execution of the third kick-down control, a switchover operation is accepted to switch the output properties such that output of the engine 10 is increased, the gear ratio is held. Accordingly, in a situation such as the depression amount of the accelerator pedal being suddenly released immediately before entering a curve, the gear ratio is held even if a switching operation is accepted to switch the output properties such that the output of the engine 10 is increased. Accordingly, change in traction while cornering can be suppressed, and acceleration can be appropriately started upon having exited the curve.

According to the implementation, in the case of accepting a switchover operation during kick-down control (any one of first kick-down mode, second kick-down mode, and third kick-down mode) to switch the output properties such that the output of the engine 10 is decreased, the kick-down control being executed is continued. Accordingly, in such a case the driver is prevented from being imparted unnecessary acceleration behavior (feeling), by continuing the control mode (kick-down control) being executed.

While an implementation of the present invention has been described, the present invention is not restricted to the above implementation, and various modifications may be made. For example, while the present invention has been applied to a chain type continuously variable transmission (CVT) in the above implementation, the present invention may be applied to a belt type continuously variable transmission or a toroidal type continuously variable transmission as well, for example, instead of a chain type continuously variable transmission.

While the configuration of the implementation has been described as output properties of the engine 10 being switchable in three stages, a configuration may be made where the output properties are switchable in two stages, or four of more stages.

While the ECU 60 that controls the engine 10 has been described in the above implementation as being separate hardware from the TCU 40 that controls the continuously variable transmission 30, an integrated hardware configuration may be used.

The invention claimed is:

1. A shift control device, comprising:
a switchover switch that accepts a switching operation of engine output properties performed by a driver; and
a kick-down controller that executes a first kick-down control, in which a gear ratio of a continuously variable transmission is changed to a low side to increase an engine speed, in a case where an accelerator is depressed to a certain level or beyond,
wherein, in execution of the first kick-down control, the switchover switch accepts the switching operation to switch the engine output properties such that at least one of an engine power and an engine torque is increased, and the kick-down controller determines whether or not to start the first kick-down control again.

2. The shift control device according to claim 1, wherein, in a case where the engine speed reaches a predetermined speed during the execution of the first kick-down control, the kick-down controller executes a second kick-down control to change the gear ratio to upshift, and
wherein, in execution of the second kick-down control, the switchover switch accepts the switching operation to switch the engine output properties such that the at least one of the engine power and the engine torque is increased, the kick-down controller disengages the second kick-down control.

3. The shift control device according to claim 2, wherein, in a case where the accelerator is released during execution of the first kick-down control, the kick-down controller executes a third kick-down control to hold the gear ratio, and
wherein, in execution of the third kick-down control, the switchover switch accepts the switching operation to switch the engine output properties such that the at least one of the engine power and the engine torque is increased, the kick-down controller holds the gear ratio.

4. The shift control device according to claim 3, wherein, in execution of one of the first kick-down control, the second kick-down control, and the third kick-down control, the switchover switch accepts the switching operation to switch the engine output properties such that the at least one of the engine power and the engine torque is decreased, the kick-down controller continues to execute the control.

5. The shift control device according to claim 1, wherein, in a case where the accelerator is released during the execution of the first kick-down control, the kick-down controller executes a third kick-down control to hold the gear ratio, and
wherein, in execution of the third kick-down control, the switchover switch accepts the switching operation to switch the engine output properties such that the at least one of the engine power and the engine torque is increased, the kick-down controller holds the gear ratio.

6. The shift control device according to claim 1, wherein the at least one of the engine power and the engine torque is increased when the switching operation of the engine output properties includes switching from a save mode to one of a normal mode and a power mode.

7. The shift control device according to claim 1, wherein the at least one of the engine power and the engine torque is increased when the switching operation of the engine output properties includes switching from a normal mode to a power mode.

8. The shift control device according to claim 1, wherein, in a case where the engine speed reaches a predetermined speed during the execution of the first kick-down control, the kick-down controller executes a second kick-down control to change the gear ratio to upshift.

9. The shift control device according to claim 8, wherein, in a case where the accelerator is released during the execution of the first kick-down control, the kick-down controller executes a third kick-down control to hold the gear ratio.

10. The shift control device according to claim 9, wherein, in execution of the third kick-down control, the switchover switch accepts the switching operation to switch the engine output properties such that the at least one of the engine power and the engine torque is increased, the kick-down controller holds the gear ratio.

11. The shift control device according to claim 10, wherein, in execution of one of the first kick-down control, the second kick-down control, and the third kick-down control, the switchover switch accepts the switching operation to switch the engine output properties such that the at least one of the engine power and the engine torque is decreased, the kick-down controller continues to execute the control.

12. A shift control method, comprising:
accepting, in a switchover switch, a switching operation of engine output properties performed by a driver,
executing a first kick-down control, in which a gear ratio of a continuously variable transmission is changed to a low side to increase an engine speed, in a case where an accelerator is depressed to a certain level or beyond; and
determining whether or not to start the first kick-down control again, in the execution of the first kick-down control, when the switchover switch accepts the switching operation to switch the engine output properties such that at least one of an engine power and an engine torque is increased.

13. The shift control method according to claim 12, wherein the at least one of the engine power and the engine torque is increased when the switching operation of the engine output properties includes switching from a save mode to one of a normal mode and a power mode.

14. The shift control method according to claim 12, wherein the at least one of the engine power and the engine torque is increased when the switching operation of the engine output properties includes switching from a normal mode to a power mode.

15. The shift control method according to claim 12, wherein, when the engine speed reaches a predetermined speed during the execution of the first kick-down control, a kick-down controller executes a second kick-down control to change the gear ratio to upshift.

16. The shift control method according to claim 15, wherein, when the accelerator is released during the execution of the first kick-down control, the kick-down controller executes a third kick-down control to hold the gear ratio.

17. The shift control method according to claim 16, wherein, in execution of the third kick-down control, the switchover switch accepts a switchover operation to switch the engine output properties such that the at least one of the engine power and the engine torque is increased, the kick-down controller holds the gear ratio.

18. The shift control method according to claim 17, wherein, in execution of one of the first kick-down control, the second kick-down control, and the third kick-down control, the switchover switch accepts the switching operation to switch the engine output properties such that the at least one of the engine power and the engine torque is decreased, the kick-down controller continues to execute the control.

19. A shift control device, comprising:
a switchover switch that accepts a switching operation of engine output properties performed by a driver; and
a kick-down controller that executes a first kick-down control, in which a gear ratio of a continuously variable transmission is changed to a low side to increase an engine speed, in a case where an accelerator is depressed to a certain level or beyond,
wherein, in execution of the first kick-down control, the switchover switch accepts the switching operation to switch the engine output properties such that at least one of an engine power and an engine torque is increased, and the kick-down controller starts the first kick-down control again.

* * * * *